(12) United States Patent
Verbowski (10) Patent No.: US 8,419,031 B1
(45) Date of Patent: Apr. 16, 2013

(54) LINK FOR VEHICLE SUSPENSION SYSTEMS

(76) Inventor: Larry Verbowski, Bay City, MI (US)

( * ) Notice: Subject to any disclaimer, the term of this patent is extended or adjusted under 35 U.S.C. 154(b) by 0 days.

(21) Appl. No.: 13/344,675

(22) Filed: Jan. 6, 2012

(51) Int. Cl.
*B60G 3/04* (2006.01)

(52) U.S. Cl.
USPC ............ 280/124.134; 280/86.75; 280/86.756; 280/93.502; 280/93.51

(58) Field of Classification Search ............... 280/86.75, 280/86.751, 86.756, 93.502, 93.508, 93.51, 280/124.134
See application file for complete search history.

(56) References Cited

U.S. PATENT DOCUMENTS

| | | | | |
|---|---|---|---|---|
| 4,836,574 A | * | 6/1989 | Ingalls | 280/86.756 |
| 5,807,010 A | * | 9/1998 | Parker et al. | 403/61 |
| 6,076,840 A | * | 6/2000 | Kincaid et al. | 280/124.107 |
| 6,224,075 B1 | * | 5/2001 | McIntyre | 280/86.751 |
| 6,293,724 B1 | * | 9/2001 | Spears et al. | 403/122 |
| 6,729,633 B1 | * | 5/2004 | Irwin | 280/86.75 |
| 7,354,054 B2 | * | 4/2008 | Pazdirek | 280/124.152 |
| 7,665,568 B2 | * | 2/2010 | Doperalski et al. | 180/358 |

* cited by examiner

*Primary Examiner* — Toan To
(74) *Attorney, Agent, or Firm* — Robert L. McKellar; McKellar IP Law, PLLC (57) ABSTRACT

A new and novel suspension link for the suspension system of vehicles, which is easily removed and replaced in a repair mode. More specifically, there is an vehicle sway bar stabilizer link that has angle capability for replacing prior art suspension links having ball-type devices which comprise a polished steel ball surround by a steel liner, or a polished steel ball surrounded by a plastic liner. A method of manufacture is also disclosed.

9 Claims, 7 Drawing Sheets

LINK FOR VEHICLE SUSPENSION SYSTEMS

BACKGROUND OF THE INVENTION

Suspension sway bar systems are designed to absorb road shock and variable dynamic loads which, if not controlled, lead to poor handling and unsafe vehicle performance. Suspension components are subjected to harsh environments such as moisture, salt, road debris and dirt, all of which have detrimental effects on each of the individual components, but mostly on the metallic components. Currently, different designs are used to provide a stabilizer link.

The invention disclosed herein deals with a new and novel suspension link for the suspension systems of vehicles, which is easily removed and replaced in a repair mode. More specifically, the present invention relates to an automotive sway bar stabilizer link that has angle capability for replacing suspension links having ball-type devices which comprise a polished steel ball surround by a steel or a plastic liner with a steel backing.

One such ball joint type component is shown in U.S. Pat. No. 6,019,383. This type of device is advantageous, in that, it provides rotatability of the ball and angular movement of the through bolt (rod) part.

Such a device has many deficiencies, however, such as minimal preload on the steel ball, steel-to-steel contact, along with no provision for lubrication as a means to extend life, and poor sealing of internal parts by a seal or a boot. Intrusion of foreign material causes rust and degradation of the internal parts resulting in accelerated wear, noise and excessive clearance which leads to reduced vehicle control and the need for a complete replacement at substantial cost. If the steel is built with a plastic liner, the tendency of the steel is to degrade the plastic which leads to the same problems discussed just Supra.

It is therefore desirable to provide an alternative device that reduces the deficiencies of the prior art products. Such ball type suspension systems have a history of being very difficult to replace when they have been essentially destroyed or fail to continue to work properly. The instant invention overcomes the problems of repair and replacement of such suspension link bars.

THE INVENTION

What is disclosed and claimed herein is a new and novel link for vehicle suspensions systems. The link comprises a riser, the riser having a top, a bottom, and two sides.

The riser top has an opening through it, there being a threaded stud attached to the bottom of riser such that the threaded portion of said stud is outside of the riser, the threaded stud has a distal end.

There is a link assembly, the link assembly comprising a rod having a near end and a distal end, wherein the near end is surmounted by a fixed hex cap and the distal end of said rod is threaded, said rod being of a predetermined length and diameter.

The rod has a first concave washer surmounted on the bottom of the hex cap and on the rod, the first concave washer being surmounted by a first bushing having a convex surface.

There is a second bushing mounted on the rod and surmounted on the top of the riser with a second concave washer mounted on the rod and surmounting the second bushing.

There is a sleeve, having a top end, mounted on the rod and surmounted on the top of the second concave washer with a third concave washer mounted on the rod and surmounted on the top end of the sleeve, the second concave washer being surmounted by a barbell bushing mounted on the rod, said barbell bushing being surmounted by a fourth concave washer. The threaded distal end of the rod has threadably affixed thereto, a lock nut wherein the diameter of the rod is substantially smaller in diameter than the diameter of the opening in the top of the riser.

In another embodiment of this invention, there is A method of manufacturing a riser for a link used in vehicle suspension systems. The method comprises providing a flat metal plate having a predetermined size and thickness, a center point, two terminal ends, and a horizontal flat bottom surface.

There is a dome formed, having predetermined dimensions, from the bottom of the flat plate and at the center point, the dome having a center point and a formed edge.

Thereafter, forming an opening through the flat plate at the center point of the dome and bending the flat plate at a predetermined distance from the formed edge of the dome of the flat plate to form a bent plate, this bend being in the range of 90° to 120°, the preferred bend being about 110°.

There is a second bend made in the flat plate a predetermined distance from the formed edge of the dome, this bend being in the range of from 100° to 120°. A bend of about 112° being preferred.

Thereafter, forming a third bend of the flat plate a predetermined distance from the formed edge of the dome, essentially at the formed edge of the dome, the bend being in the range of from 100° to 125°, wherein all of the angles of the bends are determined from the horizontal bottom surface of the flat plate, the preferred bend being about 115°.

Thereafter, bending the bent plate until the terminal ends touch, and then welding the terminal ends together, the welded terminal ends forming a bottom surface.

DETAILED DESCRIPTION OF THE INVENTION

Figure 1:
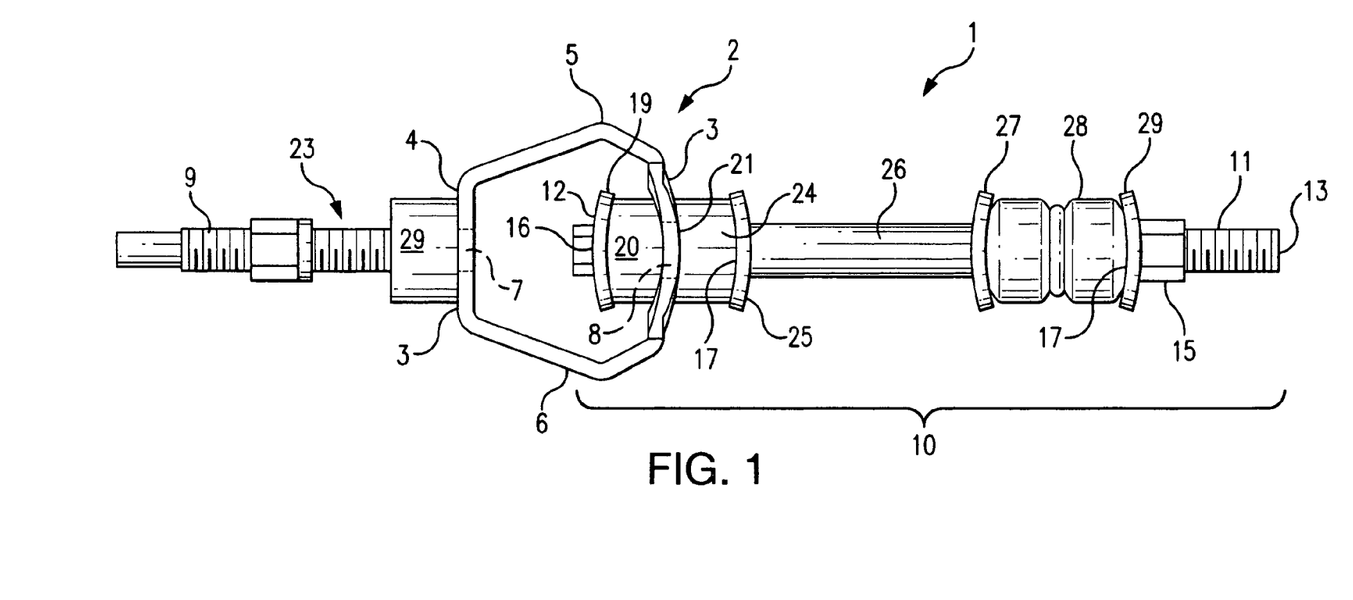
FIG. 1 is a full view of an assembled suspension link of this invention.

Turning now to the device of this invention and FIG. 1, there is shown a fully assembled suspension link 1 comprising a riser 2. The riser 2 operates as the dividing line between the fully stabilized bottom portion of the link 1 and the angularity of the top portion of the link 1.

The riser 2 has a top 3, a bottom 4, and two sides 5 and 6 and the bottom 4. The bottom 4 has a threaded stud 9 attached to it such that the threaded portion 23 is located outside of the riser 2. There is a bushing 29 fitted onto the threaded stud 9 that interfaces with the bottom surface 30 of the riser 2. The bushings size is determined by the link size and is generally in the range of from about inch to about 3 inches in diameter.

The size of the riser 2 is determined by the model and type of vehicle that the link is to be used on, for example, in a car, the riser 2 is generally about 2 to 4 inches in breadth and height, while in snowmobiles and ATV's, the size of the riser 2 is substantially less. A large truck would normally have a riser 2 in excess of 4 inches in breadth and height. At the every minimum, the rise has to be large enough to accommodate the end of the rod 11, a nut, a washer, and a bushing.

The identification of the bushings as "barbell" herein is just to differentiate such bushings from the other bushings of the device. It should be understood that the barbell bushing can be one piece, or it can be two separate pieces. When in place on the threaded rod, it resembles a barbell.

Figure 5B:
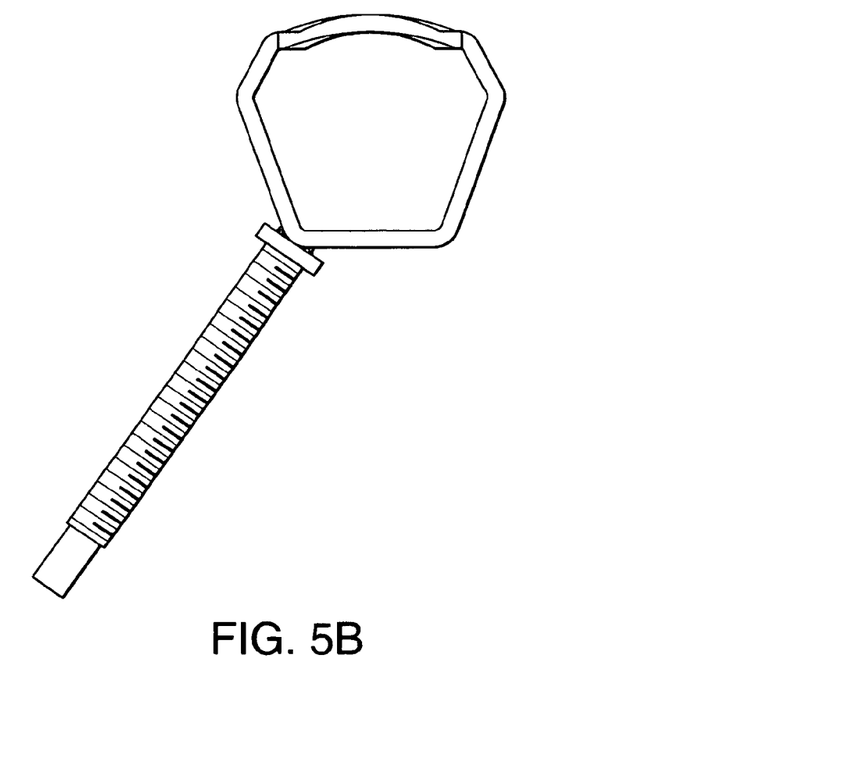
FIG. 5B is a full side view of another embodiment of this invention showing the riser with the stud attached to a corner of the riser.
Figure 5C:
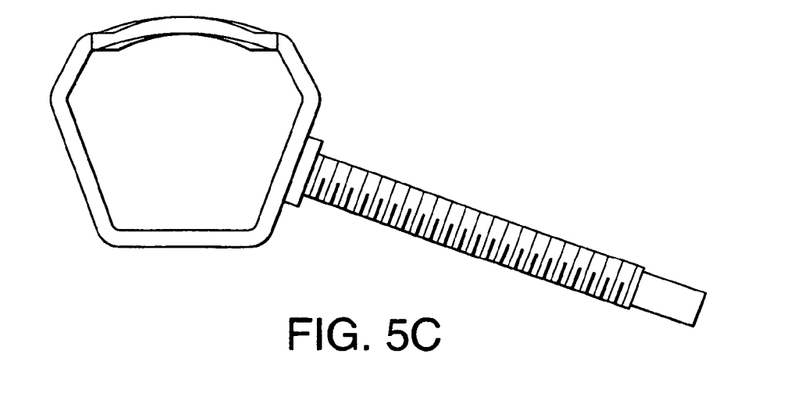
FIG. 5C is a full side view of another embodiment of this invention showing the riser with the stud attached to one of the sides of the riser.

It is contemplated within the scope of this invention to attach the stud 9 to any outside surface of the riser 2, and as shown in FIG. 5B, it is attached to one point of the riser 2 and in FIG. 5C, it is attached to one of the sides. It can be attached at any point around the riser 2 to accommodate putting an angle in the link to fit various models of vehicles, including snowmobiles, ATV's, cars, trucks, and the like The riser 2 has an opening 8 (shown in phantom, see also FIG. 3) through it. There is a link assembly 10 and the link assembly 10 comprises a rod 11 having a near end 12 and a distal end 13. The near end 12 is surmounted by a fixed hex cap 14 that can be used to turn the rod 11 or can be used with a wrench to help tighten a lock nut 15 on the distal end 13 of the rod 11, such lock nut 15 being discussed infra. The hex cap 14 has a bottom surface 16 from which the rod 11 extends. The distal end 13 of the rod 11 is threaded to receive a lock nut 15. The length of the rod 11 is predetermined so as to fit various vehicles and the length of the rod allows designs that are essentially unlimited in length. For purposes of this invention, rod lengths from about ½ inch to about 14 inches is preferred. The same is true of the diameter of the rod 11, as the diameter of the rod 11 is based on the diameter of the opening 8 wherein the diameter of the rod 11 is substantially less than the diameter of the opening 8 so that the rod 11 can be moved laterally and circuitously within the opening 8. Typically, the diameter of the rod 11 is about to ½ to ¼ of the diameter of the opening 8.

Figure 6:
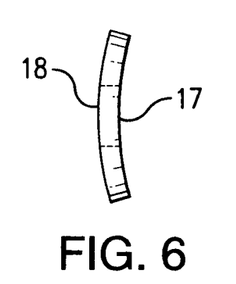
FIG. 6 is a full side view of a washer of this invention.

The washers useful in this invention are hyperbolic discs in which the inside surface 17 is concave and the outside surface 18 is convex. The washers can be manufactured from metals, fiber filled carbon, cross linked plastics such as polyethylene, cast urethane polymers, and the like.

The rod 11 has a first washer 19 which is mounted on the rod 11 and is surmounted on the bottom 16 such that the outside surface 18 faces the bottom 15 and the inside surface 17 faces a bushing 20.

Figure 7:
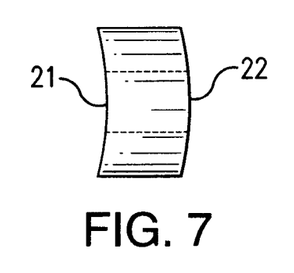
FIG. 7 is a full side view of a bushing of this invention.
Figure 8:
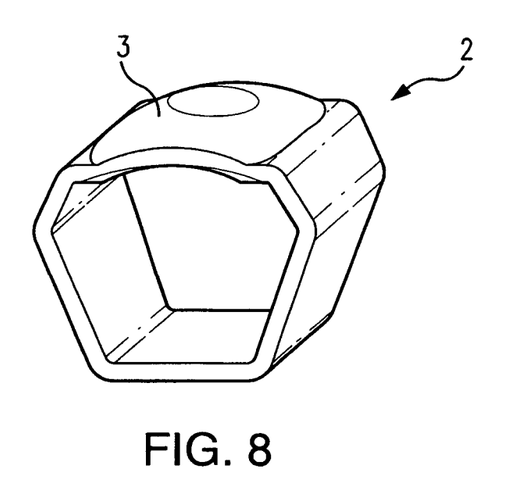
FIG. 8 is a 3-D illustration of a riser of this invention.

Bushings in this invention may be manufactured from elastomer, rubber, or hard foam rubber. Specifically, the bushings may comprise poured or cast urethane polymer. It will be appreciated that any suitable material may be used for the bushings of this invention. Other polymeric or rubber materials may be suitable. In some embodiments, such as shown in the instant device, it is preferred that the concave surfaces 21 and the convex surfaces 22 of the bushings be relatively smooth. In some embodiments it is preferred that the bushings have a Durometer of between about 45 and 90 on the Shore A scale. It will be appreciated that any suitable hardness may be used. The Durometer and size of the bushings may be adjusted to optimize the performance of the link assembly.

The bushings are continually preloaded by the rod 11 to absorb and dampen various suspension impact loads. Further, by using an elastomeric bushing adjacent a metal link member, the device requires no lubrication and provides relatively quiet operation as compared with prior art ball type linkage assemblies. The constant preload absorbs impact loads and minimizes any clearance between the bushing, link member, and other suspension components with which the link assembly may be secured. The bushings may contact the other suspension components to which the link assembly may be secured.

After the rod 11 is passed through the opening 8 from inside the riser 2, it is surmounted by a second bushing 24 wherein the concave surface 21 is fitted to the top of the riser 2. The second bushing 24 is then surmounted by a second washer 25 such that the concave surface 17 fits onto the top surface of the second bushing 24.

There is a sleeve 26 that slips onto the rod 11 and is surmounted on the second washer 25. At the top of the sleeve 26 there is mounted a third washer 27 that also slips over the rod 11 with the concave surface 17 facing a barbell bushing 28. Surmounting the third washer 27 is the barbell bushing 28 and surmounting the barbell bushing 28 is a fourth washer 29. It should be noted that the forth washer 29 is mounted such that the concave surface 17 is facing the barbell bushing 28.

The fourth washer 29 is then surmounted by the lock nut 15 and the entire link assembly 10 is tightened down.

Figures 3, 4, 5A:
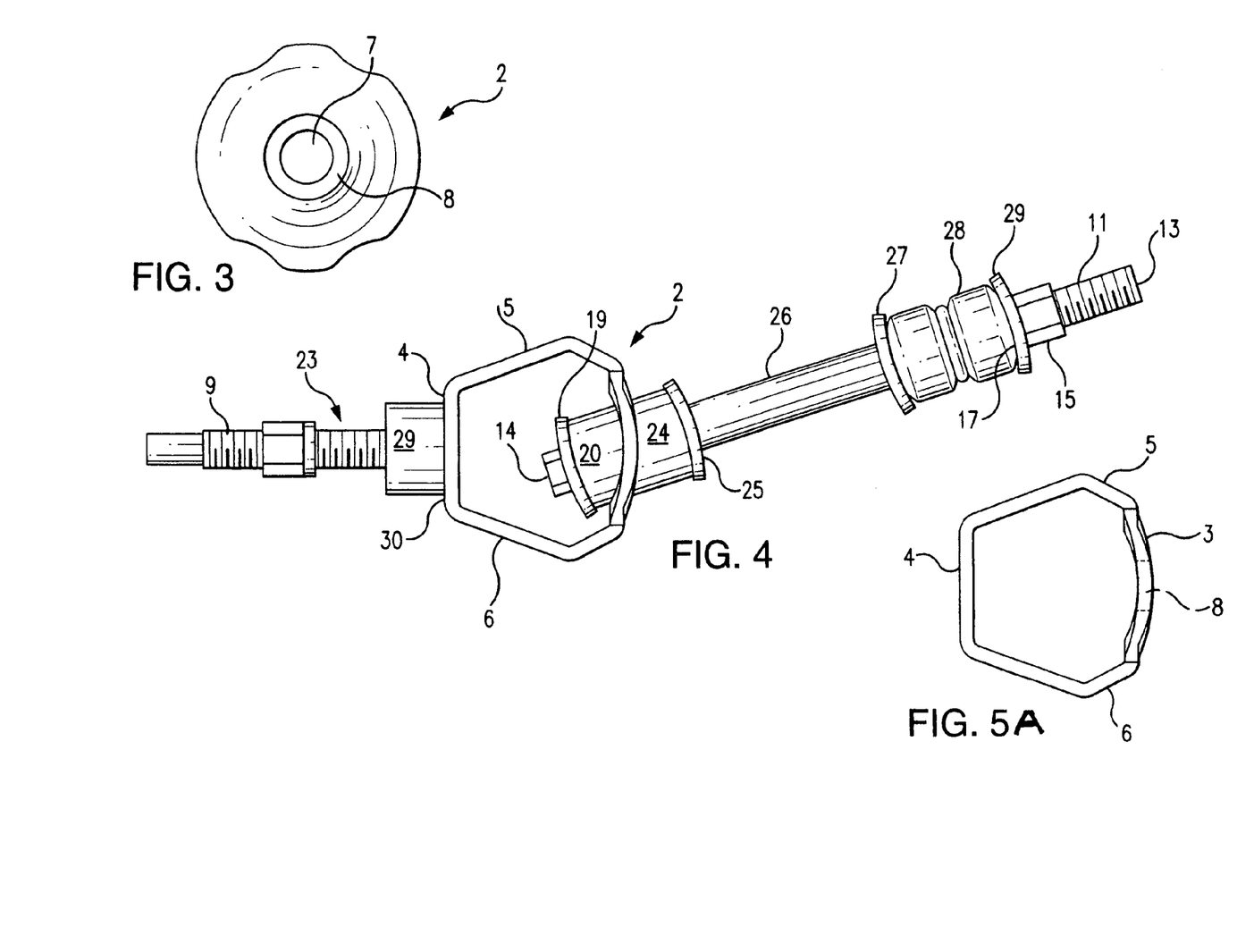
FIG. 3 is a full top view of the riser showing the substantially larger opening in the top along with the smaller opening in the bottom.
FIG. 4 is a full view of an assemble suspension link of this invention in full angle from the vertical.
FIG. 5A is a full side view of another embodiment of a riser of this invention.

FIG. 3 shows a full top view of the riser 2 in which there is shown the opening 8.

Figure 2:
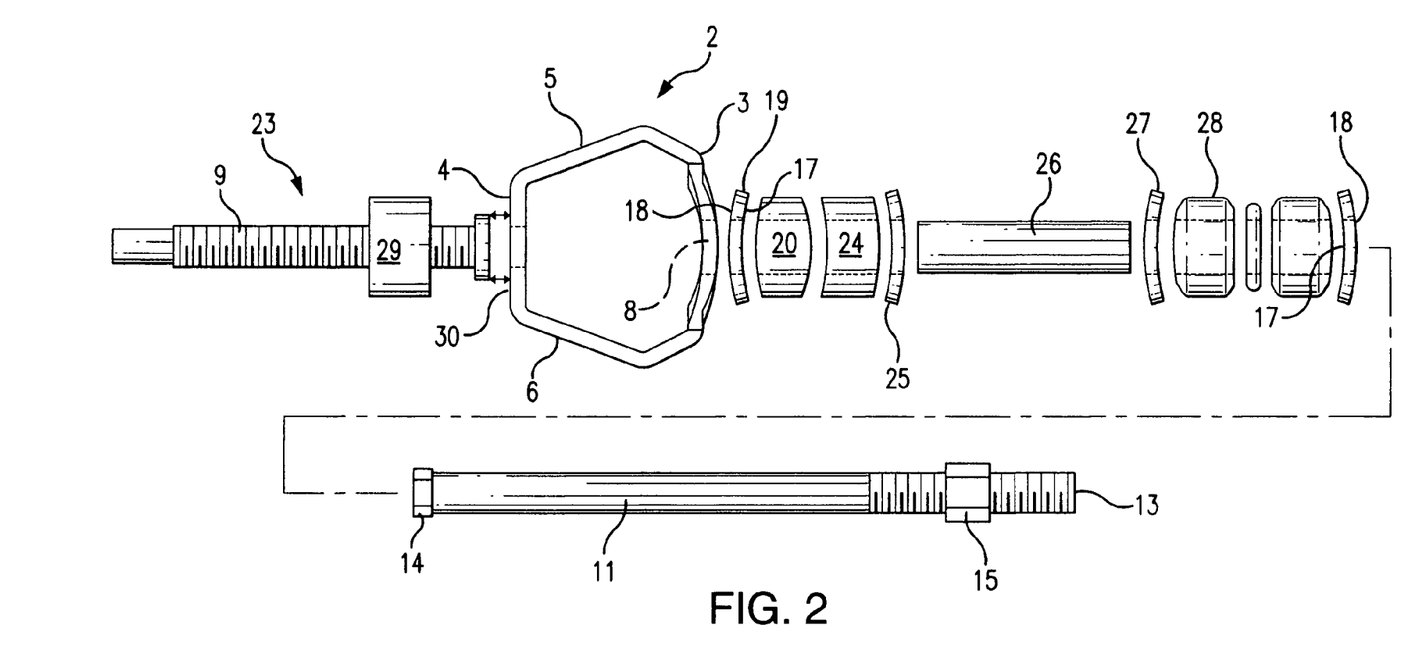
FIG. 2 is a fully exploded view of a suspension link of this invention.

Turning now to FIG. 2, there is shown an exploded view of the assembly of FIG. 1, showing how the components parts relate to each other. The numbered designations in FIG. 2 are the same as in FIG. 1.

In both FIGS. 1 and 2, the link assembly is shown in straight vertical alignment while in FIG. 4, the link assembly is shown at an angle from the straight vertical alignment. The number designations in FIG. 4 are the same as in FIG. 1.

In FIG. 5A, which is a full side view of another embodiment of the invention there is shown the riser 2 in which the side wall 5 is shorter than the side wall 6. This configuration supports the assembly of the device as the variable length of the side walls allows for the convenient insertion of the rod 11 and also helps to determine the angle of the link with regard to the threaded stud 9.

Aside from the bushings which have been described in detail Supra, the link assembly of this invention is manufactured from metals, and the most preferred metal is steel.

This inventive device provides a capability for the link to be angled to simulate the prior art ball and socket while providing a device that is easy to refurbish when needed simply by removing the rod 11 and rebuilding the assembly.

Using a simple rod through the bushing and the link member makes the link assembly easily rebuildable by simply removing the rod and replacing the bushings. The rod can then be reinserted to attach the link assembly with the vehicle suspension.

Turning now to the method of this invention, and with regard to FIGS. 9A to 9F, there is shown the steps in manufacturing a device of this invention.

Figure 9A:
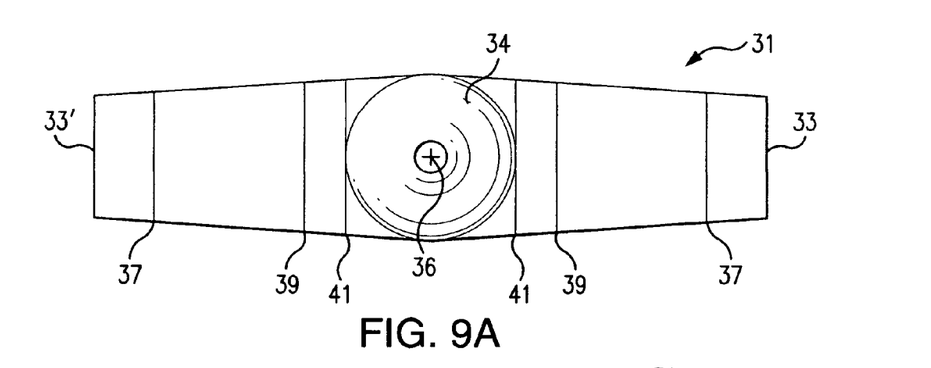
FIG. 9A is an illustration of a flat plate used in the method of this invention.
Figure 9B:
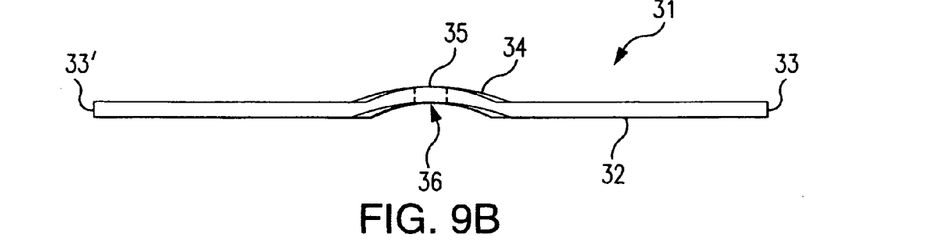
FIG. 9B is an illustration of a dome and opening provided in the flat plate.

FIG. 9A is an illustration of a flat plate 31 of this invention showing a horizontal flat bottom surface 32 and terminal ends 33 and 33'. FIG. 9B illustrates the flat plate 31 with a dome 34 formed in the metal from the bottom flat surface 32, upwardly. Also shown in phantom is the opening 35 formed in the center point 36 of the dome 34.

Figure 9C:
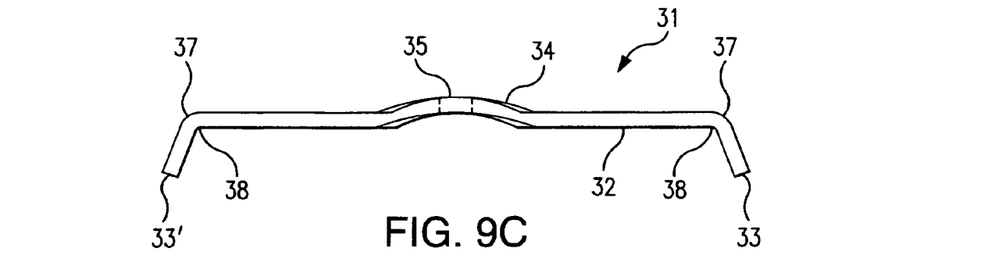
FIG. 9C is an illustration of the first bend of the flat plate, wherein the bend is about 111° calculated from the horizontal bottom surface of the flat plate.
Figure 9D:
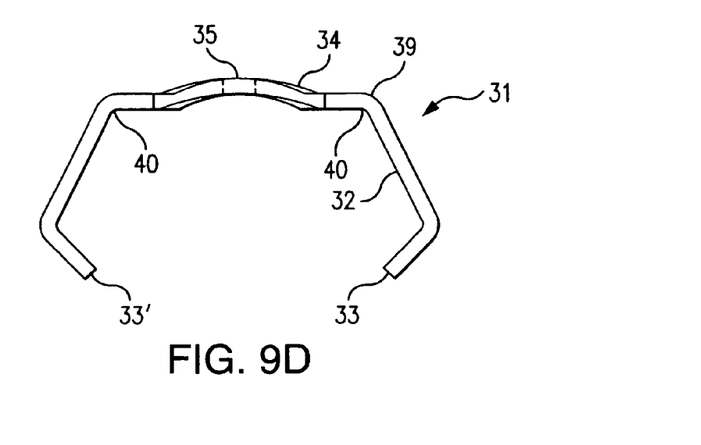
FIG. 9D is an illustration of the second bend of the flat plate, wherein the bend is about 115° calculated from the horizontal bottom surface of the flat plate.

FIG. 9C is an illustration of the first bend 37 in the flat plate 31, at point 38. In addition, FIG. 9D illustrates the second bend 39, at point 40.

Figure 9E:
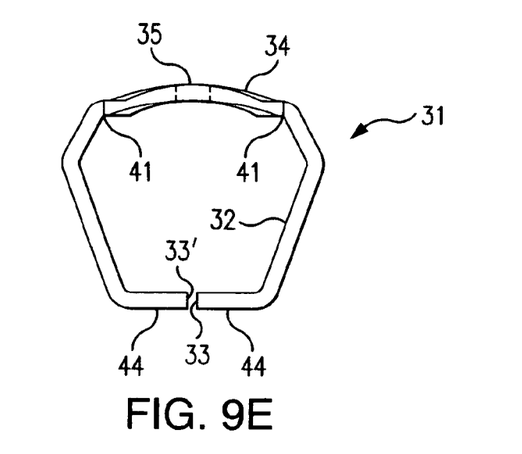
FIG. 9E is an illustration of the third bend of the flat plate, wherein the bend is about 115° calculated from the horizontal bottom surface of the flat plate.

FIG. 9E illustrates the third bend 41, at points 42 and the bending of the flat plate 31 until the terminal ends 33 and 33' meet, although, in the illustration, the ends 33 and 33' do not meet for clarification reasons. It is important at this point that this third bend and the complete bend be made without torqueing the dome 34 and bending the dome 34 downward, as the dome 34 should remain round in order for the link to operate smoothly.

Figure 9F:
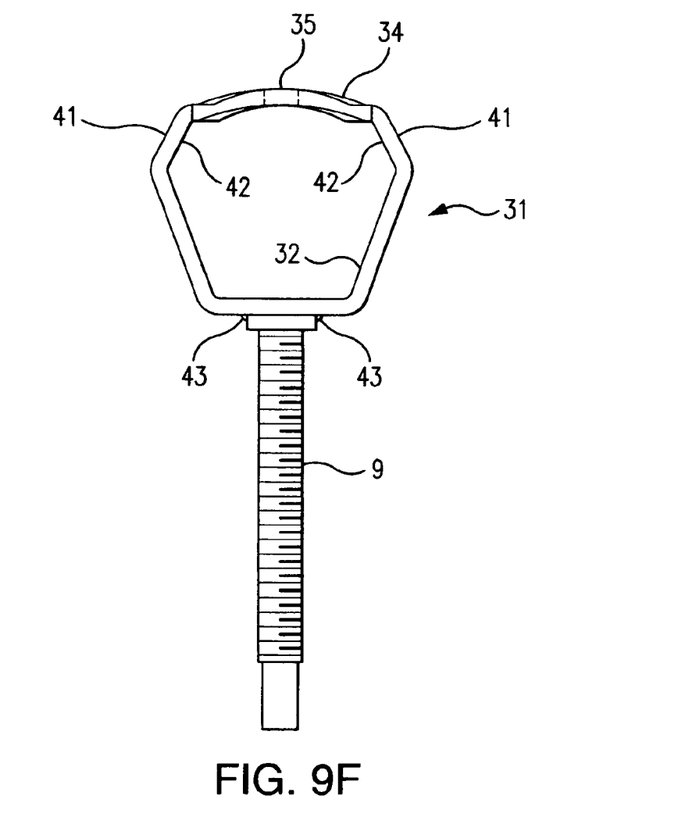
FIG. 9F is an illustration of the flat plate bent until the terminal ends meet, along with an illustration of attaching the threaded stud to the bottom surface of the terminal ends.

FIG. 9F illustrates the complete bending of the flat plate 31 to form the riser. In addition, there is shown the attachment of the threaded stud 9. Shown are weld points 43 at the bottom surface 44 of the terminal ends 33 and 33' (44 shown in FIG. 9E).

The riser can be fully formed and welded and then the threaded stud 9 can be welded on, or the threaded stud 9 can be welded on at the same time that the two terminal end 33 and 33' are welded together.

What is claimed is:

1. A link for vehicle suspension systems, said link comprising:
    a riser, said riser having a top, a bottom, and two sides;
    said riser top having an opening therethrough;
    there being a threaded stud attached to the riser, such that the threaded portion of said stud is outside of the riser, said threaded stud having a distal end;
    a link assembly, said link assembly comprising a rod having a near end and a distal end, said near end being surmounted by a fixed hex cap and the distal end of said rod being threaded, said rod being of a predetermined length and diameter;
    said rod having a first concave washer surmounted on the bottom of the hex cap and on the rod, said first concave washer being surmounted by a first bushing having a convex surface;
    there being a second bushing mounted on the rod and surmounting the top of the riser;
    there being a second concave washer mounted on the rod and surmounting the second bushing;
    there being a sleeve, having a top end, mounted on the rod and surmounted on the top of the second concave washer;
    there being a third concave washer mounted on the rod and surmounted on the top end of the sleeve, said second concave washer being surmounted by a barbell bushing mounted on the rod, said barbell bushing being surmounted by a fourth concave washer;
    said threaded distal end of the rod having threadably affixed thereto, a lock nut;
    the diameter of the rod being substantially smaller in diameter than the diameter of the opening in the top of the riser.

2. The link for vehicle suspension systems as claimed in claim 1 wherein the threaded stud is attached to the riser at the bottom surface formed by the terminal ends of the flat plate.

3. The link for vehicle suspension systems as claimed in claim 1 wherein the threaded stud is attached to the riser at a bottom point of the riser.

4. The link for vehicle suspension systems as claimed in claim 1 wherein the threaded stud is attached to the riser along one of the sides of the riser.

5. A method of manufacturing a riser for a link used in vehicle suspension systems, said method comprising:
    providing a flat metal plate having a predetermined size and thickness, a center point, two terminal ends, and a horizontal flat bottom surface;
    forming a dome, having predetermined dimensions, from the bottom of the flat plate and at the center point, said dome having a center point and a formed edge;
    forming an opening through the flat plate at the center point of the dome;
    bending the flat plate at a predetermined distance from the formed edge of the dome to form a bent plate, said bend being in the range of 90° to 120°;
    making a second bend of the flat plate a predetermined distance from the formed edge of the dome, said bend being in the range of from 100° to 120°;
    forming a third bend of the flat plate a predetermined distance from the formed edge of the dome, essentially at the formed edge of the dome, said bend being in the range of from 100° to 125°, wherein all of the angles of the bends are determined from the horizontal bottom surface of the flat plate;
    bending the bent plate until the terminal ends touch, and then welding the terminal ends together, said welded terminal ends forming a bottom surface.

6. The method as claimed in claim 5 wherein a threaded stud is welded to the bottom surface of the terminal ends.

7. The method as claimed in claim 6 wherein the threaded stud is welded to the bottom surface of the terminal ends at the same time as the terminal ends are welded together.

8. The method as claimed in claim 5 wherein the threaded stud is welded to a point on the bottom of the riser.

9. The method as claimed in claim 5 wherein the threaded stud is welded to a side of the riser.

* * * * *